Patented Apr. 13, 1954

2,675,325

UNITED STATES PATENT OFFICE 2,675,325

PLASTICIZER FOR RESINOUS MATERIALS AND COMPOSITIONS MADE THEREWITH

Charles E. Dill, Florham Park, N. J., assignor to The Patent and Licensing Corporation, New York, N. Y., a corporation of Massachusetts No Drawing. Application November 12, 1949, Serial No. 126,927

14 Claims. (Cl. 106—123)

This invention relates to plasticizers for brittle resinous materials and is more particularly concerned with a plasticizer for thermo-plastic resins, such as those used in the manufacture of molded or calendered floor and wall coverings.

In the use of brittle resinous materials it is generally necessary to incorporate with the resinous material a softening or plasticizing agent to overcome the brittle character of the material and to render the resin suitable for compounding with fillers, pigments and the like. To be satisfactory, however, in the case of molded or calendered products such as floor tiles and wall tiles, the plasticizer should, when incorporated with the brittle resin, produce a plasticized resin composition having satisfactory resistance to cold flow or indentation under static load. The plasticizer should also impart alkali resistance to the tile in order that it be not damaged by the action of alkaline detergents used for cleaning the same and in order that it may be used on concrete or similar surfaces from which alkali tends to be leached out by moisture. In addition, the plasticizer must not separate from the product, by evaporation or bleeding and it must not deleteriously affect the color of the resinous material.

Various types of plasticizers have been proposed, but for the most part those which are intended for plasticizing resinous materials for use in the manufacture of floor tiles and the like have been found to be relatively expensive to manufacture or have been found to be deficient with respect to one or more of the above-noted criteria.

It is the principal object of this invention to provide an effective, relatively inexpensive plasticizer for brittle resinous materials.

It is a further object of the invention to provide a plasticized resinous binder particularly suitable for use in the manufacture of molded or calendered resinous products.

It is a still further object of the invention to provide a thermoplastic composition for forming into tiles.

Other objects and features of the invention will be apparent from the following detailed description.

The above and related objects are realized in accordance with the invention by providing a plasticizer which comprises: (1) the reaction product of a hydrated metal oxide and the resin acid residue derived from tall oil, and (2) a paraffinic hydrocarbon oil substantially identical with that obtained as the raffinate in the solvent extraction of petroleum oils with solvents having a preferential solvent action upon the aromatic and naphthenic constituents of the petroleum oil. I have found that the combination of the tall oil resin acid-metal oxide reaction product with the paraffinic hydrocarbon oil raffinate provides an economical, efficient plasticizer particularly suitable for plasticizing resins used in the manufacture of light-colored, alkali-resistant floor and wall tiles, and the like. While my plasticizer is particularly effective and suitable for plasticizing natural and synthetic resins, it is also of general utility and has an efficient plasticizing effect on gilsonite, hard asphalts, polymerized coal-tar residues, and the like.

In one form of my invention, I may also react the hydrated metal oxide-resin acid residue reaction product with a small amount of a polyhydric alcohol having at least 3 carbon atoms. The polyhydric alcohol is advantageously used to effect controlled variations in the melting point and/or acid number of the plasticizer.

The resin acid residue which I employ in preparing my plasticizer is a by-product of the treatment of tall oil to recover the fatty acid values therefrom and is the residue remaining after the major proportion of the fatty acids have been separated from tall oil by known treating methods such as distillation, or solvent extraction, or other convenient means. The resin acid residue is a mixture of saponifiable and unsaponifiable materials predominating in a mixture of resin acids. Tall oil is a by-product of the sulphate or "kraft" process for making paper pulp, wherein wood chips are digested with a solution of sodium sulphide and sodium hydroxide at elevated temperatures and pressure. During digestion, the lignin, fats and resins in the wood are dissolved by the alkaline solution and when the wood pulp is separated from the digestion medium there remains a dark-colored, odorous alkaline solution which is known as "black liquor." In order to recover the sodium salts from the black liquor for reuse in the process, the black liquor is concentrated in a multi-effect evaporator. As the concentration of the black liquor progresses, the fatty acids and resin acids, originally present in the wood as glycerides, are salted out as sodium soaps, which carry with them minor quantities of other acidic and neutral components. The soaps, which appear on the surface as a foam or scum, are skimmed off and decomposed by treatment with a mineral acid, such as sulfuric acid, to produce a two-phase liquid system consisting of a lower aqueous layer and an upper oily layer which contains the organic components of the soaps. This oily layer is called tall oil. Roughly, the composition of tall oil is as follows:

|  | Per cent |
|---|---|
| Resin acids | 25 to 50 |
| Fatty acids | 45 to 70 |
| Other materials | 5 to 15 |

The variation in composition is due to differences in the botanical species of wood used, or to the phase of the seasonal cycle of the three when harvested, or to differences in technique between different paper mills, or other like factors.

The tall oil may be treated to separate a portion of the more valuable fatty acids by various known processes. After the fatty acids have been separated to the extent economically feasible, there remains a residual product containing the major proportion of the resin acids originally present in the tall oil, some fatty acids, and certain unsaponifiable materials. A representative resin-acid residue which is suitable for use in accordance with the invention has the following composition:

|  | Per cent |
|---|---|
| Resin acids | 50 to 70 |
| Fatty acids | 20 to 30 |
| Unsaponifiables | 10 to 15 |

A typical residue of this character preferred for use in the preparation of my plasticizer has a viscosity (Saybolt Universal) of 500 to 600 seconds at 210° F.

The polyhydric alcohol which I may employ in the preparation of my plasticizer is glycerine, sorbitol or other polyhydric alcohol having at least 3 carbon atoms and a melting point not above about 275° C. Preferably, I employ a polyhydric alcohol containing four hydroxy groups, such as pentaerithritol.

The hydrated metal oxide which I react with the resin acid residue in making my improved plasticizer is the hydrated oxide of any metal which forms insoluble soaps with resin acids. I preferably employ the hydrated oxide of a metal falling in group II of the periodic table, such as calcium or zinc.

The paraffinic oil constituent of my plasticizer is an oil obtained by selective solvent extraction of petroleum oil fractions, particularly those fractions above the kerosene range. Various solvents are conventionally used for the extraction step, particularly dichloroethylether, furfural, liquid sulphur dioxide, nitrobenzene, phenol, cresol and the like. These solvents preferentially dissolve the cyclic constituents of the fraction treated, leaving as raffinate a predominantly paraffinic oil. This paraffinic oil is the oil used in accordance with the invention. The properties of this raffinate oil will vary depending upon the origin of the petroleum oil treated, the boiling range of the fraction extracted, the type of solvent employed, and other factors. An illustrative raffinate oil which I have found suitable has the following properties:

| SSU @ 100° F. | 500 to 750. |
|---|---|
| Sp. gr. | .885 to .90. |
| Flash | 450° F. to 500° F. |
| Fire point | 525° F. to 575° F. |
| Pour point | −10° F. to 20° F. |
| Viscosity index | 60 to 100. |

In carrying out the invention, the tall oil resin acid residue and the paraffinic raffinate oil are heated together in a suitable vessel, such as an agitated open kettle, at a temperature from about 250° F. to 500° F. The hydrated metal oxide is added gradually to the heated mixture. Preferably, I also add a small amount of an antifoaming agent at this stage. Heating is continued until the violent evolution of gases which takes place during the initial stages of the reaction subsides and the volume of gases evolved becomes substantially constant. The quantity of metal oxide used should be sufficient to react with a substantial portion of the tall oil resin acid residue admixed with the paraffinic raffinate oil. For best results the quantity of metal oxide should be between about 8 and 12%, based on the weight of the resin acid residue, and preferably I employ 10% of freshly hydrated metal oxide, e. g. hydrated calcium oxide, per part of tall oil resin acid residue. After the reaction has subsided as above indicated, the polyhydric alcohol, if employed, is added to the reaction mass and further reaction carried out by heating the mixture at a temperature of from about 400° F. to 520° F., until the desired extent of reaction has been effected, i. e. until the desired melting point and acid number is reached. When the polyhydric alcohol is not used, heating at 300–400° F., is continued until the desired acid number is obtained. If the melting point rises above the value desired, it may be lowered by adding a small amount of an aromatic hydrocarbon oil, e. g. up to about 5% based on the weight of the plasticizer. Generally speaking, I employ 0.5 to 1.5 parts of paraffinic raffinate oil per part of tall oil resin acid residue, and preferably I employ 0.6 to 0.75 part of the raffinate oil per part of resin acid residue.

While the properties of my plasticizer are, of course, subject to variation depending upon the type and relative proportions of the various ingredients, in accordance with the preferred embodiment of my invention, I may prepare a plasticizer having a softening point of 130° F. to 170° F., an acid number not in excess of 20, and an aniline point between about 70° C. and 90° C.

To prepare a plasticized resinous composition suitable, for example, for the manufacture of molded or calendered products, such as floor tiles and wall tiles, I blend my plasticizer in any convenient manner with a brittle thermoplastic resin, such as a coumarone-indene resin, polymerized styrene homologs, terpene resins or like hydrocarbon resins. Rosin or a resinous derivative of rosin, e. g. limed rosin, heat-treated rosin, hydrogenated rosin, rosin esters, and the like, may also be used. My plasticizer is also effective for plasticizing natural resins such as Congro resin, East India gum and the like. While my plasticizer is of particular advantage in preparing light colored thermoplastic products embodying brittle resinous materials of the type mentioned above, it is also of general utility and has an efficient plasticizing action upon gilsonite, hard petroleum asphalts and various polymerized still residues obtained in the distillation of coal tar, water gas tar, petroleum and similar hydrocarbon oils.

Blending of my plasticizer with the resinous material to be plasticized is advantageously effected by mixing the ingredients in a heated mixer, e. g. a rubber mill, although various types of internal mixers are also suitable.

In preparing a composition adapted for use in forming a molded or calendered product, suitable proportions of fillers and pigments are combined with the plasticized resin. Advantageously, the fillers and pigments are mixed with the resin and plasticizer during the initial mixing operation, i. e. during the step of combining the resin with the plasticizer, and all the ingredients are mixed until homogeneous. While the temperature of the mixer may vary, it should be high enough to cause partial liquefaction of the thermoplastic ingredients. In most cases I have found a temperature of 175° to 350° F. to be suitable. The proportions of plasticized resin to filler will vary depending upon the type of product desired. For example, in the manufacture of tile for floor and wall coverings, the plasticized resin, which constitutes the binder component, represents about 25 to 35% of the product. The fillers used may be asbestos fibers, organic fibers such as wood pulp, cotton linters and the like, or non-fibrous materials such as cork or mineral fillers of various types e. g. ground limestone and talc. Sufficient small quantities of pigments, e. g. 2 to 5%, are added to impart the desired color to the product. The compounded mixture of plasticized resin and filler is readily molded or calendered to any desired form in accordance with customary practice.

The following specific examples in which all parts are by weight, are further illustrative of the invention without, however, being intended in any way as a limitation thereon.

*Example I*

This example illustrates the preparation of my plasticizer according to one embodiment of the invention.

Sixty parts of a resin acid residue derived from tall oil and 40 parts of a paraffinic raffinate oil were introduced into an agitated open kettle and heated to a temperature of 250° F. To the heated and agitated paraffinic oil-resin acid residue mixture were then added .009 part of DC antifoam No. 200 (a silicone type anti-foaming agent) followed by the slow addition of 6 parts of freshly hydrated calcium oxide. The addition of the hydrated calcium oxide required about 3 hours and when the addition was completed the temperature had risen to 350° F. The batch was held at 350–370° F. to obtain the desired low acid number. After 3 hours of heating the product had the following characteristics.

Melting point (ASTM ring and ball) _____ 170° F.
Acid number (mg. KOH/gm.) _____ 12
Color (Helege—0.1% solution in xylol) ___ 1
Aniline point _____ 80° C.

To this product were then added 2.5 parts of a viscous aromatic oil of the type obtained as extract in the solvent extraction of lubricating oils and the mass mixed until uniform, which required about 15 minutes. The melting point of the plasticizer was thereby reduced to 150° F.

The tall oil resin acid residue used in the foregoing formulation had a fatty acid content of about 25%, a rosin acid content of about 60%, and contained about 15% unsaponifiables. The paraffinic raffinate oil employed had a specific gravity of 0.8922, a flash point of 480° F., a fire point of 540° F., a pour point of 0° F., a Saybolt Universal viscosity of 644 seconds at 100° F., and a viscosity index of 83.

*Example II*

This example shows the preparation of my plasticizer employing a polyhydric alcohol.

Sixty parts of the resin acid residue derived from the tall oil and 40 parts of the paraffinic raffinate oil described in Example I were introduced into an agitated open kettle and heated to a temperature of 470–480° F. To the heated paraffinic oil-resin acid residue mixture were then added .009 part of DC antifoam and there were then added slowly, with agitation, 6 parts of freshly hydrated calcium oxide. During the addition of the calcium oxide a rather vigorous evolution of gases occurred. When the reaction subsided and the evolution of gases became substantially constant, i. e. after about 1 hr., 1.6 parts of pentaerithritol were added and the mass heated at 510–520° F., for about 2 hrs. The resulting product had the following properties:

Melting point (ASTM ring and ball) _____ 140° F.
Color (Helege—0.1% solution in xylol) __ 2
Acid number (mg. KOH/gm.) _____ 10
Aniline point _____ 80° C.

A plasticized resin composition, e. g. a resinous binder suitable for the formulation of molding and calendering compositions, may be readily made by compounding the plasticizer, prepared according to Example I or II, with a brittle resin, e. g. a coumarone-indene resin. Advantageously, the compounding is effected by adding the resin, preferably in pulverized form, directly to the kettle containing the hot, freshly made plasticizer and the components mixed until homogeneous. The compounding of the resin with the plasticizer may, however, be carried out by other means, for example, by adding the plasticizer and resin to a heated, internal mixer and blending the two components into a homogeneous mass. When my plasticizer is to be used to plasticize the brittle resinous component of a molding or calendering composition, the resin plasticizer and the fillers and other components may advantageously all be mixed in a single operation as shown in the following example.

*Example III*

Thirty-five parts of a coumarone-indene resin and fifteen parts of the composition prepared in Example I were introduced between the rolls of a two-roll rubber mill, and the two components milled until the resin and plasticizer were reasonably well blended. This required about 3 minutes. To the milled resin-plasticized mass were then added 100 parts of asbestos, 20 parts of ground limestone filler and 5 parts of red iron oxide pigment. The mixture was compounded by continued milling until a homogeneous mass was obtained, which required about 10 minutes. The mass was then calendered into a sheet which was substantially cut into rectangle flooring tiles in accordance with customary practice in manufacturing thermoplastic tile. The resulting tiles were found to have satisfactory resistance to cold flow and indentation under static load and to exhibit good alkali resistance. After prolonged standing and exposure to light, no separation of plasticizer was apparent and the tile showed excellent resistance to discoloration.

Similar satisfactory results are obtained when blending suitable proportions of the plasticizer with other hydrocarbon resins, resinous derivatives of rosin or other resins of natural origin or derivatives thereof, in place of all or part of the coumarone-indene resin used in the foregoing example.

It will be apparent that various modifications may be made without departing from the scope of

I claim:

1. A plasticizer for brittle resins and the like which comprises the heat reaction product of a resin acid fraction derived from tall oil and containing resin acids and a smaller proportion of fatty acids in admixture therewith with a hydrated oxide of a metal forming insoluble soaps with said resin acids, and a paraffinic hydrocarbon oil comprising the raffinate obtained by the selective solvent extraction of a petroleum oil.

2. A plasticizer as defined in claim 1, wherein said paraffinic raffinate is present in the proportion of approximately 0.6 to 0.75 part per part of said tall oil fraction.

3. A plasticizer as defined in claim 1, wherein said metal oxide is calcium oxide.

4. A plasticizer for brittle resins and the like which comprises a major proportion of the heat reaction product of a resin acid fraction derived from tall oil and containing resin acids and a smaller proportion of fatty acids in admixture therewith with a hydrated oxide of a metal forming insoluble soaps with said resin acids and a minor proportion of a paraffinic hydrocarbon oil comprising the raffinate obtained by the selective solvent extraction of a petroleum oil, said plasticizer being characterized by a softening point of 125–170° F., an acid number not above about 20, a color Helege 0.1% concentration in xylol not more than about 4, and an aniline point between about 70° C. and 90° C.

5. A plasticizer for brittle resins and the like which comprises a major proportion of the heat reaction product of a polyhydric alcohol of at least 3 carbon atoms, a resin acid fraction derived from tall oil and containing resin acids and a smaller proportion of fatty acids in admixture therewith and a hydrated oxide of a metal forming insoluble soaps with said resin acids, and a minor proportion of a paraffinic hydrocarbon oil comprising the raffinate obtained by the selective solvent extraction of a petroleum oil.

6. A plasticizer as defined in claim 5, wherein said polyhydric alcohol is pentaerithritol.

7. A plasticizer as defined in claim 5, wherein said metal oxide is calcium oxide.

8. A plasticizer for brittle resins and the like which comprises a major proportion of the heat reaction product of a polyhydric alcohol of at least 3 carbon atoms, a resin acid fraction derived from tall oil and containing resin acids and a smaller proportion of fatty acids in admixture therewith and a hydrated oxide of a metal forming insoluble soaps with said resin acids, and a minor proportion of a paraffinic hydrocarbon oil comprising the raffinate obtained by the selective solvent extraction of a petroleum oil, said plasticizer being characterized by a softening point of 125–170° F., an acid number not above about 20, a color Helege 0.1% concentration in xylol not more than about 4, and an aniline point between about 70° C. and 90° C.

9. A plasticized resinous composition comprising a brittle thermoplastic resin having admixed therewith a plasticizer comprising a major proportion of the heat reaction product of a resin acid fraction derived from tall oil and containing resin acids and a smaller proportion of fatty acids in admixture therewith and a hydrated oxide of a metal forming insoluble soaps with said resin acids and a minor proportion of a paraffinic hydrocarbon oil comprising the raffinate obtained by the selective solvent extraction of a petroleum oil, said plasticizer being characterized by a softening point of 125–170° F., an acid number not above about 20, a color Helege 0.1% concentration in xylol not more than about 4, and an aniline point between about 70° C. and 90° C.

10. A plasticized composition according to claim 9, wherein said brittle resin is of natural origin.

11. A plasticized composition according to claim 9, wherein said resin is a coumarone-indene resin.

12. A plasticized resinous composition comprising a brittle thermoplastic resin having admixed therewith a plasticizer comprising a major proportion of the heat reaction product of a polyhydric alcohol of at least 3 carbon atoms, a resin acid fraction derived from tall oil and containing resin acids and a smaller proportion of fatty acids in admixture therewith and a hydrated oxide of a metal forming insoluble soaps with said resin acids, and a minor proportion of a paraffinic hydrocarbon oil comprising the raffinate obtained by the selective solvent extraction of a petroleum oil.

13. A moulding and calendering composition comprising about 25 to about 35% by weight of plasticized brittle thermosplastic resin and the balance filler, said resin being plasticized by a composition comprising a major proportion of the heat reaction product of a resin acid fraction derived from tall oil and containing resin acids and a smaller proportion of fatty acids in admixture therewith and a hydrated oxide of a metal forming insoluble soaps with said resin acids, and a minor proportion of a paraffinic hydrocarbon oil comprising the raffinate obtained by the selective solvent extraction of a petroleum oil.

14. A plasticizer for brittle resins and the like consisting essentially of the heat reaction product of a resin acid fraction derived from tall oil and containing resin acids and a smaller proportion of fatty acids in admixture therewith, with a hydrated metal oxide capable of forming insoluble soaps with said resin acids, said metal oxide being present in an amount between 8% and 12% based on the weight of said acid fraction and from 0.5 to 1.5 parts by weight of a paraffinic hydrocarbon oil per part of said resin acid fraction, said hydrocarbon oil comprising the raffinate obtained by the selective solvent extraction of a petroleum oil.

References Cited in the file of this patent

UNITED STATES PATENTS

| Number | Name | Date |
| --- | --- | --- |
| 2,175,491 | Stresen-Reuther et al. | Oct. 10, 1939 |
| 2,416,676 | Bernardi et al. | Mar. 4, 1947 |
| 2,421,842 | Martin | June 10, 1947 |
| 2,448,621 | Rice | Sept. 7, 1948 |
| 2,578,833 | Frick | Dec. 18, 1951 |
| 2,616,814 | Mahler | Nov. 4, 1952 |

OTHER REFERENCES

Friedman, Plastics Trends, vol. II, No. 15, Aug. 1942, page 7.